United States Patent
Yamamoto et al.

(10) Patent No.: US 7,123,797 B2
(45) Date of Patent: Oct. 17, 2006

(54) DIRECTIONAL COUPLER SWITCH

(75) Inventors: Noritsugu Yamamoto, Ibaraki (JP); Tohru Ogawa, Ibaraki (JP)

(73) Assignee: National Institute of Advance Industrial Science and Technology, Tokyo (JP)

( * ) Notice: Subject to any disclaimer, the term of this patent is extended or adjusted under 35 U.S.C. 154(b) by 0 days.

(21) Appl. No.: 11/209,856

(22) Filed: Aug. 24, 2005

(65) Prior Publication Data

US 2006/0188199 A1    Aug. 24, 2006

(30) Foreign Application Priority Data

Feb. 24, 2005    (JP)    ............... P.2005-049654

(51) Int. Cl.
*G02B 6/26* (2006.01)
*G02B 6/42* (2006.01)

(52) U.S. Cl. ............... 385/42; 385/25; 385/26; 385/27

(58) Field of Classification Search ........... 385/42, 385/25, 26, 27
See application file for complete search history.

(56) References Cited

U.S. PATENT DOCUMENTS 6,795,597 B1 *    9/2004    Ridgway et al. ............... 385/11
6,931,192 B1 *    8/2005    Ridgway et al. ............... 385/129

* cited by examiner

*Primary Examiner*—Brian Healy
*Assistant Examiner*—Mary El-Shammaa
(74) *Attorney, Agent, or Firm*—Morgan, Lewis & Bockius LLP

(57) ABSTRACT

The directional coupler switch is configured by a parallel waveguide including a first region which is subjected to a nonlinear action and a second region which is not subjected to a nonlinear action. A dispersion relationship of the first region is varied due to the nonlinear action to switch over an exit of light entering from an input side to cause the switch to function as an optical switch. A dispersion curve of the first region has: a region of a constant frequency in one of an even mode and an odd mode which are two kinds of eigen modes of the parallel waveguide; and a region in which gradients of the two eigen modes at frequencies belonging to a region other than the region of a constant frequency are substantially equal to each other. The gradients of the two kinds of eigen modes indicate monotone decreasing or monotone increasing.

6 Claims, 6 Drawing Sheets

SECTION OF SYMMETRIC PARALLEL WAVEGUIDE

EVEN MODE

ODD MODE ical coupler
DIRECTIONAL COUPLER SWITCH

BACKGROUND OF THE INVENTION

The present invention relates to a directional coupler switch in a dispersion relationship of a region of part of a parallel waveguide is changed due to a nonlinear action to change an exit of light entering from an input side, thereby functioning as an optical switch.

FIG. 1 shows a section view of a symmetric parallel waveguide, and a conceptual diagram of an even mode and an odd mode which are eigen modes thereof. Two waveguides of the symmetric parallel waveguide are referred to as A and B, respectively, and each of the waveguides has an even mode and an odd mode as its eigen modes.

FIG. 2A is a diagram showing superposition of the even mode on the odd mode, and FIG. 2B is a diagram showing superposition of the even mode on the odd mode in which the phase is inverted with respect to FIG. 2A. As shown in the figure, by inverting the phase, it is possible to laterally interchange electromagnetic distribution positions after superposition. When the even mode and the odd mode are added in a specific phase, light is concentrated on one of the waveguides (for example, the waveguide A) (FIG. 2A). When the even mode and the odd mode are added after inverting the phase (shifting by $\pi$), it is possible to represent a condition where light is concentrated on the waveguide B, conversely (FIG. 2B).

FIG. 3A is a diagram showing an initial condition in which output is performed from a waveguide that is opposite to the input waveguide, and FIG. 3B is a diagram showing a condition where the output waveguide is switched over by enhancing the intensity of coupling, so that output is performed from the waveguide which is the same as the input waveguide. When a phase difference between the even mode and the odd mode on the output side can be changed by $\pi$ by means of external control, the output can be intentionally switched over between A and B, thereby causing the parallel waveguide to function as a switch.

(Description of a Structure in which a Refractive Index Variable Section, and a Refractive Index Fixed Section are Separately Provided)

FIG. 4 is a schematic diagram of a directional coupler switch. A region 1 is a portion which is subjected to a nonlinear action, and a region 2 is a portion which is not subjected to the action. The dispersion relationship in the region 1 is varied due to the nonlinear action, so that the exit of light entering from the input side is changed from an off-state output to an on-state output, thereby causing the switch to function as an optical switch.

Switching is performed by the variation of a dispersion curve due to the nonlinear effect.

The length of a portion in which the variation is performed (the region 1) is $L_{sw}$, and the length of a portion in which the variation is not performed (the region 2) is $L_{fix}$.

The switch-off state is defined as a condition in which light is emitted from a waveguide on an opposite side to the incident waveguide, after the light is propagated through the regions 1 and 2.

The switch-on state is defined as a condition in which light is emitted from a waveguide on the same side as the incident waveguide, after the light is propagated through the regions 1 and 2.

The wave numbers of the even mode and the odd mode of the region 2 are represented by $k_{2e}$ and $k_{2o}$.

The wave numbers of the region 1 in the switch-off state are represented by $k_{1e,off}$ and $k_{1o,off}$.

The wave numbers of the region 1 in the switch-on state are represented by $k_{1e,on}$ and $k_{1o,on}$.

The switch-off state satisfies the following expression:
[Ex 1]

$$L_{sw}(k_{2e,off}-k_{2o,off})+L_{fix}(k_{2e}-k_{2o})=(2m+1)\pi: \text{m is an arbitrary integer} \quad (1)$$

The switch-on state satisfies the following expression:
[Ex 2]

$$L_{sw}(k_{1e,on}-k_{1o,on})+L_{fix}(k_{2e}-k_{2o})=2l\pi \text{ is an arbitrary integer} \quad (2)$$

When a structure which satisfies the conditions is produced, it is possible to realize a directional coupler switch.

(Description of Switching Length)

When a difference between Expressions (2) and (1) is obtained, the following is held:
[Ex. 3]

$$L_{sw}\{(k_{1e,on}-k_{1o,on})-(k_{1e,off}-k_{1o,off})\}=(2m+1)\pi: \text{m is an arbitrary integer} \quad (3)$$

$L_{se}$ is referred to as a switching length.

(Conditions for Shortening the Switching Length)

The switching length is represented by the following:
[Ex. 4]

$$L_{sw} \equiv \frac{(2m+1)\pi}{(k_{1e,on}-k_{1o,on})-(k_{1e,off}-k_{1o,off})} \quad (4)$$

The dispersion relationships in the even and odd modes are represented by $\omega_{1e}(k,n)$ and $\omega_{1o}(k,n)$. In the expression, n is a parameter which indicates a factor for varying the dispersion curve such as a refractive index of a medium. As for the even mode, a total differential is obtained as follows:
[Ex. 5]

$$d\omega_{1e} = \frac{\partial \omega_{1e}}{\partial k}dk + \frac{\partial \omega_{1e}}{\partial n}dn \quad (5)$$

When an operating frequency is fixed to a specific value, $d\omega_{1e}=0$. When the expression is solved with respect to dk, the following relationship is obtained:
[Ex. 6].

$$dk = -\frac{1}{\frac{\partial \omega_{1e}}{\partial k}}\frac{\partial \omega_{1e}}{\partial n}dn \quad (6)$$

An amount of variation of n when the switch-off state is changed to the on state is represented by $\Delta n$. In the case where the amount of variation is minute, the following is held:
[Ex. 7]

$$k_{1e,on} - k_{1e,off} \cong -\frac{1}{\frac{\partial \omega_{1e}}{\partial k}\big|_{k=k_{1e,off},n=n_{off}}}\frac{\partial \omega_{1e}}{\partial n}\Delta n \quad (7)$$

The same relationship is held for the odd mode, similarly.

Since the shift amount of the dispersion curve due to the variation of the parameter n is substantially constant, the following relationship can be established.

[Ex. 8]

$$\frac{\partial \omega_{1e}}{\partial n} \cong \frac{\partial \omega_{1o}}{\partial n} = C$$

By using this relationship, $L_{sw}$ can be expressed as follows:

[Ex. 9]

$$L_{sw} \cong \frac{(2m+1)\pi}{-\frac{1}{\frac{\partial \omega_{1e}}{\partial k}}\frac{\partial \omega_{1e}}{\partial n}\Delta n + \frac{1}{\frac{\partial \omega_{1o}}{\partial k}}\frac{\partial \omega_{1o}}{\partial n}\Delta n} \quad (8)$$

$$= \frac{(2m+1)\pi}{\left(-\frac{1}{\frac{\partial \omega_{1e}}{\partial k}} + \frac{1}{\frac{\partial \omega_{1o}}{\partial k}}\right)C\Delta n}$$

In order to reduce the length $L_{sw}$, a difference between the followings:

[Ex. 10]

$$\frac{\partial \omega_{1e}}{\partial k} \text{ and } \frac{\partial \omega_{1o}}{\partial k}$$

that is, a difference in group velocity between the even mode and the odd mode is increased, whereby the length can be shortened.

(Definition of Bandwidth)

The propagation constant of the eigen mode of a directional coupler is varied depending on a frequency. Therefore, a phase difference between the even mode and the odd mode after the propagation of a predetermined distance fluctuates depending on the frequency of the propagation light. For a directional coupler which is designed so that light incident on the side A at a certain frequency (operating frequency) $\omega_o$ can be taken out from the side B, when light of a different frequency is incident, deviation occurs in a phase difference between the even mode and the odd mode at the emitting end. Therefore, the output from the side B is decreased, and some light may be emitted from the side A. Consequently, a frequency range in which the variation in phase difference between the even and odd modes at the emitting end falls within an allowable amount $\phi$ is defined as a bandwidth.

(Conditions for Widening a Bandwidth)

An allowable phase difference is set to ±φ. Consideration is performed for the switch-off state. At the operating frequency, Expression (1) is held. When the wave numbers of the regions 1 and 2 in the case where the operating frequency is deviated by $\Delta\omega_{off}$ are $k'_{1e,off}$, $k'_{1o,off}$, $k'_{2e}$, and $k'_{2o}$, respectively, the relationship with respect to the allowable phase difference is as follows:

[Ex. 11]

$$L_{sw}(k'_{1e,off} - k'_{1o,off}) + L_{fix}(k'_{2e} - k'_{2o}) = (2m+1)\pi + \phi \quad (9)$$

When Expression (1) is subtracted from Expression (9), the following is obtained:

[Ex. 12]

$$L_{sw}\{(k'_{1e,off} - k'_{1o,off}) - (k_{1e,off} - k_{1o,off})\} + L_{fix}\{(k'_{2e} - k'_{2o}) - (k_{2e} - k_{2o})\} = \phi \quad (10)$$

Based on the differential expression (5) of the dispersion relationship, in this case, the frequency fluctuates, and the refractive index is constant, so that the following can be represented.

[Ex. 13]

$$k'_{1e,off} - k_{1e,off} \cong \frac{1}{\left.\frac{\partial \omega_{1e}}{\partial k}\right|_{k=k_{1e,off}, n=n_{off}}}\Delta\omega \quad (11)$$

Since the differences of other wave numbers can be represented similarly, Expression (10) can be expressed as follows:

[Ex. 14]

$$L_{sw}\left(\frac{1}{\left.\frac{\partial \omega_{1e,off}}{\partial k}\right|_{k=k_{1e,off}, n=n_{off}}}\Delta\omega_{off} - \frac{1}{\left.\frac{\partial \omega_{1o,off}}{\partial k}\right|_{k=k_{1o,off}, n=n_{off}}}\Delta\omega_{off}\right) + \quad (12)$$

$$L_{fix}\left(\frac{1}{\left.\frac{\partial \omega_{2e}}{\partial k}\right|_{k=k_{2e}}}\Delta\omega_{off} - \frac{1}{\left.\frac{\partial \omega_{2e}}{\partial k}\right|_{k=k_{2o}}}\Delta\omega_{off}\right) = \phi$$

$$\Delta\omega_{off} = \frac{\phi}{L_{sw}\left(\frac{1}{\left.\frac{\partial \omega_{1e,off}}{\partial k}\right|_{k=k_{1e,off}, n=n_{off}}} - \frac{1}{\left.\frac{\partial \omega_{1o,off}}{\partial k}\right|_{k=k_{1o,off}, n=n_{off}}}\right) +} \quad (13)$$

$$L_{fix}\left(\frac{1}{\left.\frac{d\omega_{2e}}{dk}\right|_{k=k_{2e}}} - \frac{1}{\left.\frac{d\omega_{2o}}{dk}\right|_{k=k_{2o}}}\right)$$

The obtained result $\Delta\omega_{off}$ is the bandwidth in the switch-off state. The bandwidth in the switch-on state can be obtained in the same way. The bandwidth of a directional coupler switch falls within a common range of the bandwidths in the switch on and off states. In order to increase the bandwidth, the denominator of Expression (13) should be reduced. In other words, a difference between the followings:

[Ex. 15]

$$\frac{\partial \omega_{1e}}{\partial k} \text{ and } \frac{\partial \omega_{1o}}{\partial k}$$

that is, a difference in group velocity should be reduced.

(Trade-Off Relationship)

As described above, in order to shorten the switching length, it is necessary to increase the difference in group velocity between the even mode and the odd mode. However, in order to widen the bandwidth, it is necessary to decrease the difference in group velocity. They contradict each other.

In this way, they are in a trade-off relationship. For this reason, in a conventional directional coupler switch which is configured by a simple symmetric parallel waveguide, either of the switching length or the bandwidth may be sacrificed.

SUMMARY OF THE INVENTION

It is an object of the invention to improve both of them at the same time.

In the directional coupler switch of the invention, a dispersion relationship is varied due to a nonlinear action to switch over an exit of light entering from an input side, thereby functioning as an optical switch. A dispersion curve has: a region of a constant frequency in one of an even mode and an odd mode which are two kinds of eigen modes of a parallel waveguide; and a region in which gradients of the two kinds of eigen modes at a frequency belonging to a region other than the region of a constant frequency are substantially equal to each other.

Alternatively, the directional coupler switch of the invention is configured by a parallel waveguide including a first region which is subjected to a nonlinear action and a second region which is not subjected to a nonlinear action. A dispersion relationship of the first region is varied due to the nonlinear action to switch over an exit of light entering from an input side, thereby causing the switch to function as an optical switch. A dispersion curve of the first region has: a region of a constant frequency in one of an even mode and an odd mode which are two kinds of eigen modes of a parallel waveguide; and a region in which gradients of the two eigen modes at frequencies belonging to a region other than the region of a constant frequency are substantially equal to each other.

The gradients of the two kinds of eigen modes indicate monotone decreasing or monotone increasing. The dispersion curve of the region can be realized by utilizing a photonic crystal.

Both the switching length and the bandwidth which are in the trade-off relationship can be improved at the same time without sacrificing either of them.

DETAILED DESCRIPTION OF THE PREFERRED EMBODIMENTS

Figure 1:
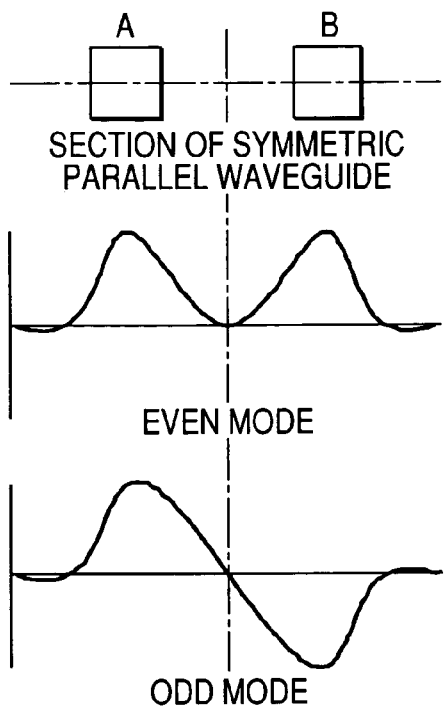
FIG. 1 is a section view of a symmetric parallel waveguide, and a conceptual diagram of an even mode and an odd mode.
Figures 2A, 2B:
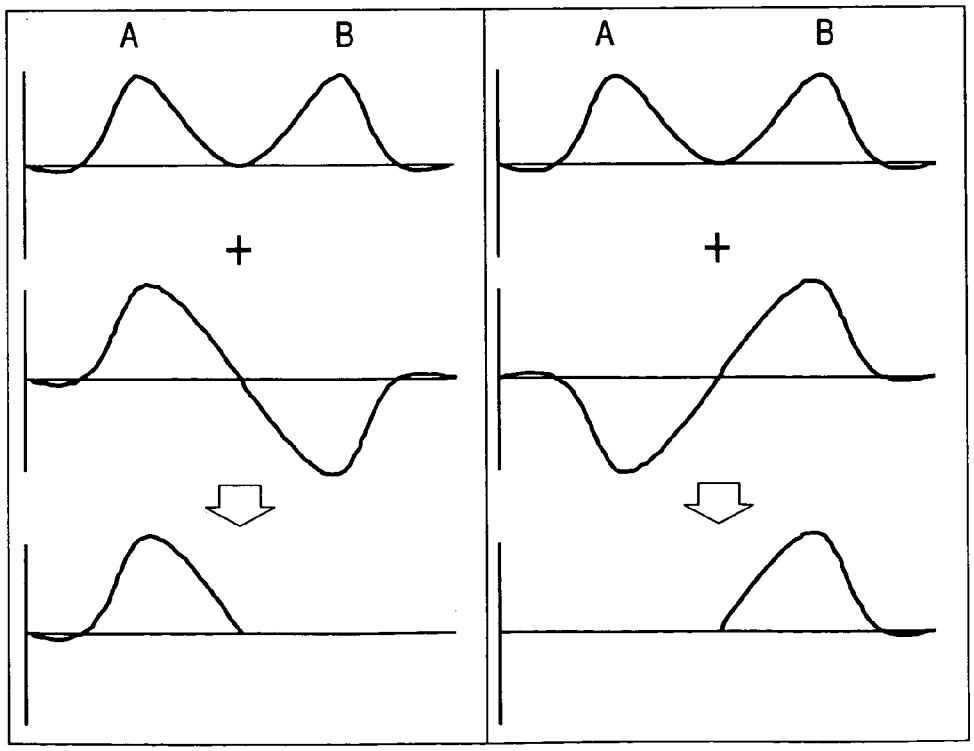
FIG. 2A shows the superposition of the even mode on the odd mode.
FIG. 2B shows the superposition of the even mode on the odd mode in which the phase is inverted with respect to FIG. 2A.
Figure 3A:
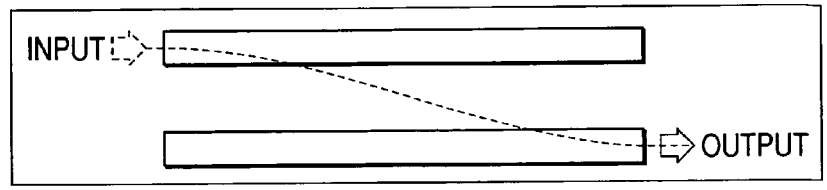
FIG. 3A shows an initial condition and FIG. 3B shows a condition where an output end is changed by enhancing the intensity of coupling.
Figure 3B:
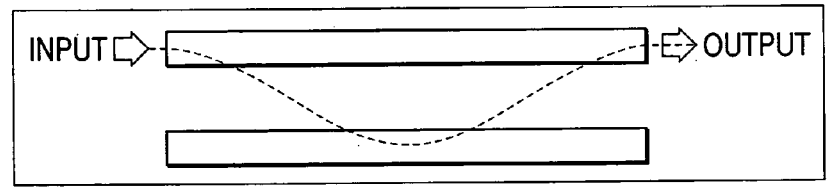
Figure 4:
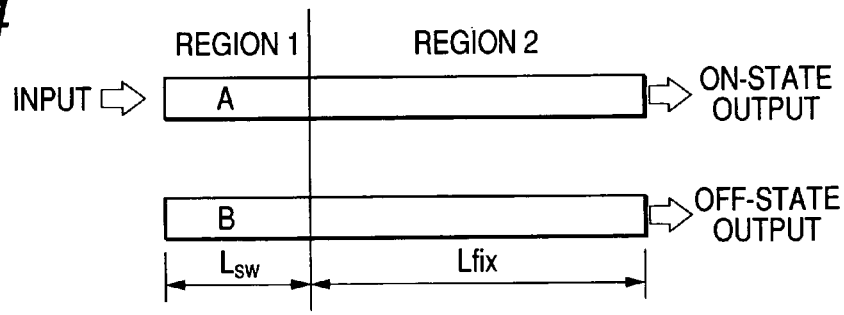
FIG. 4 is a schematic diagram showing a first example of a directional coupler switch.

As described above with reference to FIG. 4, a directional coupler switch is configured by the region 1 which is subjected to a nonlinear action, and the region 2 which is not subjected to a nonlinear action. The region 1 includes the parallel waveguides A and B each having a length $L_{sw}$. The invention is characterized in the configuration of the region 1, and provided with a structure having the following dispersion curve.

Figure 5:
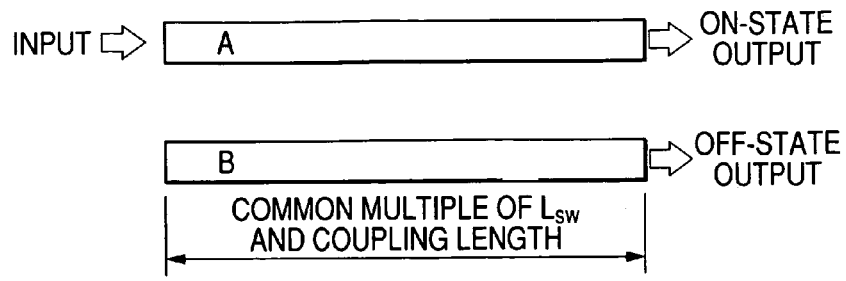
FIG. 5 is a schematic diagram showing a second example of a directional coupler switch.

Alternatively, as seen in FIG. 5 showing another example of a directional coupler switch, the total length of the directional coupler switch including the parallel waveguides A and B is configured by a region which is subjected to a nonlinear action, and the length of a region which is subjected to a nonlinear action is set to a common multiple of the switching length $L_{sw}$ and a coupling length. Also in this structure, the same functions can be attained. The coupling length means a length required for, in a parallel waveguide, the light incident on one of the waveguides to completely transfer to the other waveguide during the propagation through the parallel waveguide.

In the above-described case, when either of the conditions of a common multiple of the coupling length in the switch-off state and the switching length, or a common multiple of the coupling length in the switch-on state and the switching length is satisfied, the directional coupler switch functions as an optical switch.

Figure 6:
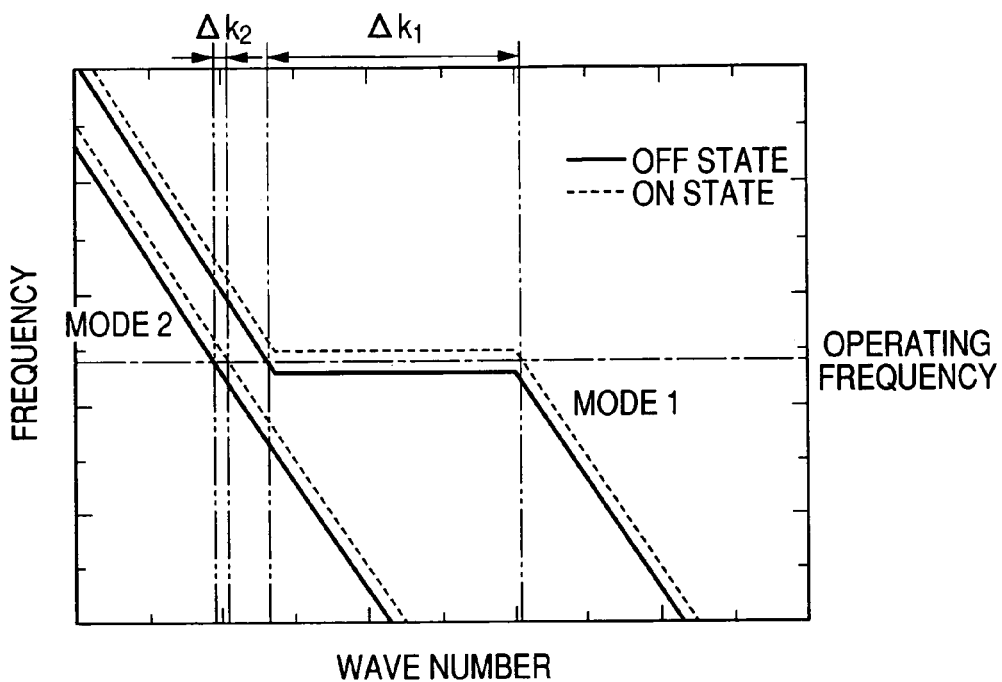
FIG. 6 is a schematic diagram 1 of a dispersion relationship for simultaneously realizing the widening of the bandwidth and the shortening of the switching length.

In order to simultaneously improve the switching length and the bandwidth, the dispersion curve is set in such a manner that one of the two kinds of eigen modes (the even mode and the odd mode) of the parallel waveguide is flat. First, the case where the dispersion curve exhibits monotone decreasing is considered. FIG. 6 is a schematic diagram 1 of the dispersion relationship by which both the widening of the bandwidth and the shortening of the switching length can be realized at the same time.

When the dispersion relationship shown in FIG. 6 is established, the widening of the bandwidth and the shortening of the switching length can be performed at the same time. Due to the nonlinear effect, when the conditions (such as a refractive index) of a material which forms the parallel waveguide are varied, the waveguide mode is shifted in a direction of frequency. In FIG. 6, the solid line indicates an off state, and the broken line indicates an on state. In the two kinds of eigen modes of the parallel waveguide, one of the modes (the mode 2 in the figure) has a dispersion relationship of monotone decreasing.

The dispersion relationship of the other mode (the mode 1) is configured by regions of monotone decreasing with the same gradient as that of the mode 2, and a region which is between the regions, and in which the frequency is constant. The operating frequency of the switch is set between the frequency constant region in the off state and the frequency constant region in the on state, as shown in the figure. Since the group velocities (the gradients of the dispersion curves) of the modes 1 and 2 in the vicinity of the operating frequency are equal to each other in both the switch-off state and the switch-on state, the bandwidth is the region in which the gradient of the mode 1 inflects, i.e., in the frequency constant region.

Next, the wave number change of the respective modes when the switch state is changed from off to on will be described. The mode 2 is increased by an amount which is proportional to a shift amount of the gradient and dispersion relationship in the frequency direction ($\Delta k_2$). As for the mode 1, in addition to the shift amount of the gradient x, a difference in wave number of the frequency constant region is added, so that the wave number varying amount is increased ($\Delta k_1$).

As shown in Expression (4), the switching length is inversely proportional to the difference in wave-number variation amount between the respective modes, that is, inversely proportional to $|\Delta k_1 - \Delta k_2|$. Depending on the length of the frequency constant region, $|\Delta k_1 - \Delta k_2|$ is increased. Therefore, the switching length can be shortened.

Figure 7:
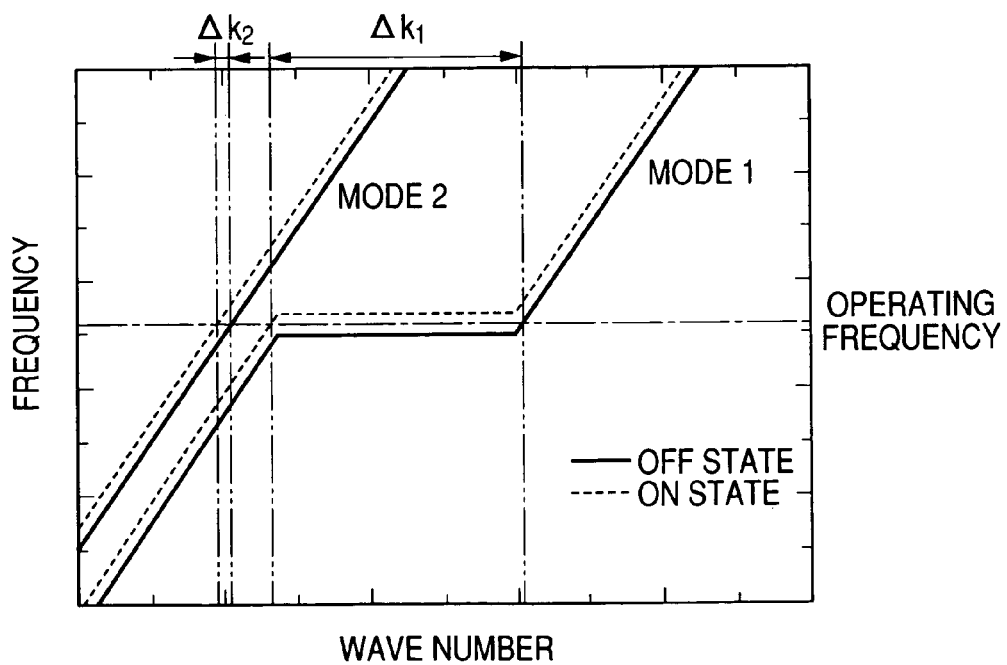
FIG. 7 is a schematic diagram 2 of a dispersion relationship for simultaneously realizing the widening of the bandwidth and the shortening of the switching length.

Similarly, in the case where the dispersion relationship is monotone increasing, both the widening of the bandwidth and the shortening of the switching length can be realized by setting the frequency constant region in one mode. FIG. 7 is a schematic diagram 2 of a dispersion relationship for simultaneously realizing the widening of the bandwidth and the shortening of the switching length. When a parallel waveguide having such dispersion relationship is designed, the trade-off relationship between the bandwidth and the switching length can be eliminated.

In order to adjust the dispersion curve, a photonic crystal is used. An exemplary configuration using the photonic crystal to cause the dispersion relationship to have the shape as shown in FIG. 6 or 7 will be described.

Figure 8:
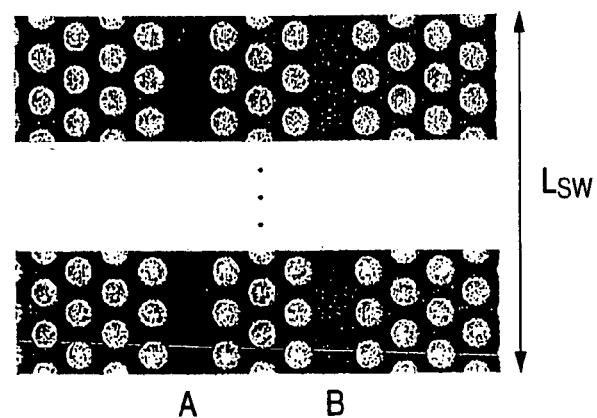
FIG. 8 is a diagram showing a directional coupler formed in a triangular lattice two-dimensional photonic crystal.
Figure 9:
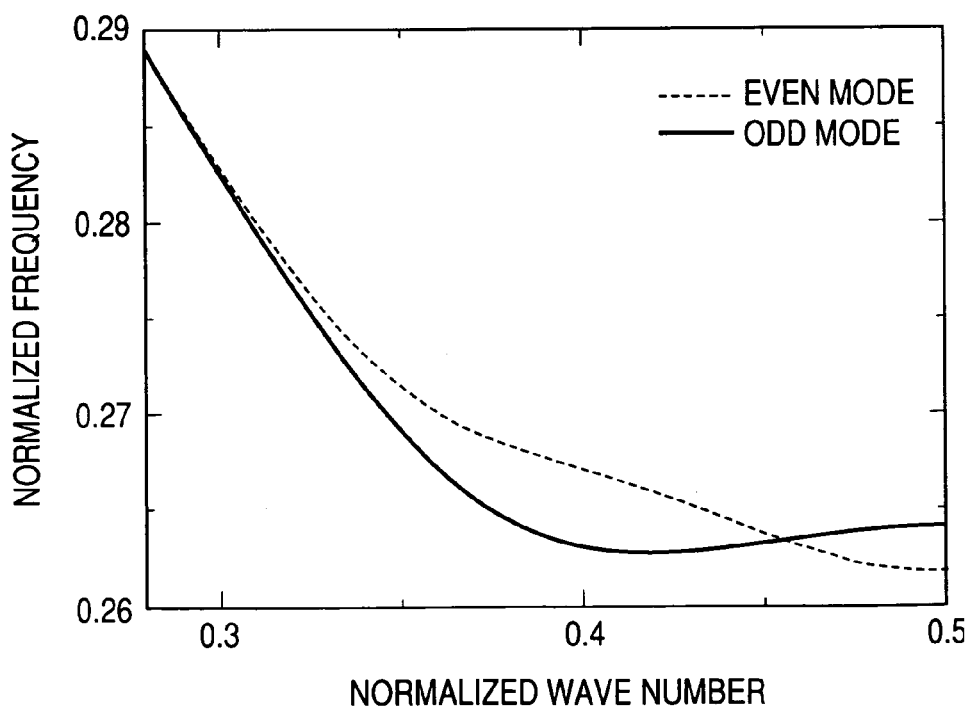
FIG. 9 is a diagram showing a dispersion relationship of a structure shown as the conventional structure (FIG. 8).

Numerical analysis is conducted by using a photonic crystal in which cylindrical air holes are arranged in a triangular lattice in a semiconductor. In a usual directional coupler having the simplest configuration, a waveguide is formed by removing a column of cylindrical holes from the triangular lattice arrangement, and such waveguides are arranged in parallel. FIG. 8 shows a directional coupler formed in a triangular lattice two-dimensional photonic crystal. The eigen modes of this structure have the shapes as shown in FIG. 9. FIG. 9 shows a dispersion relationship of the structure shown as the conventional structure (FIG. 8).

Parameters used in the calculation are as follows. The refractive index of a background medium is 2.76, the refractive index of the cylindrical holes is 1, and the radius of each cylindrical hole with respect to the lattice constant a is 0.29a. The calculation is performed by the two-dimensional plane wave expansion method. As seen from FIG. 9, both the curves in the even mode and the odd mode are monotone decreasing, and there is no region in which the frequency is constant.

Figure 10:
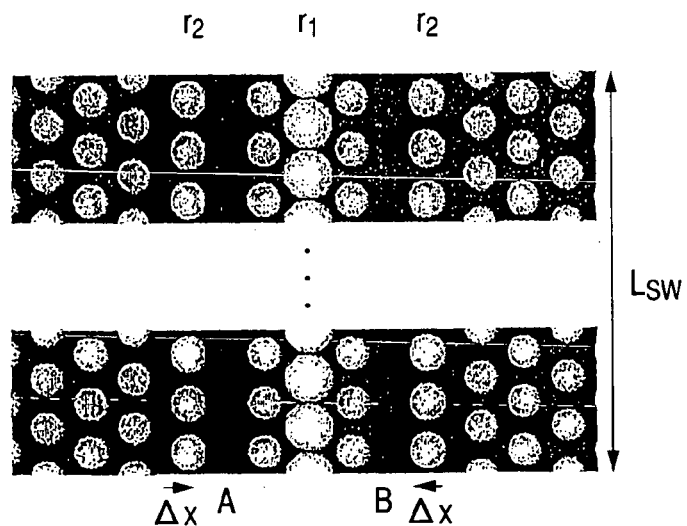
FIG. 10 is a diagram showing a directional coupler which is designed so as to have the dispersion relationship shown in FIG. 6.
Figure 11:
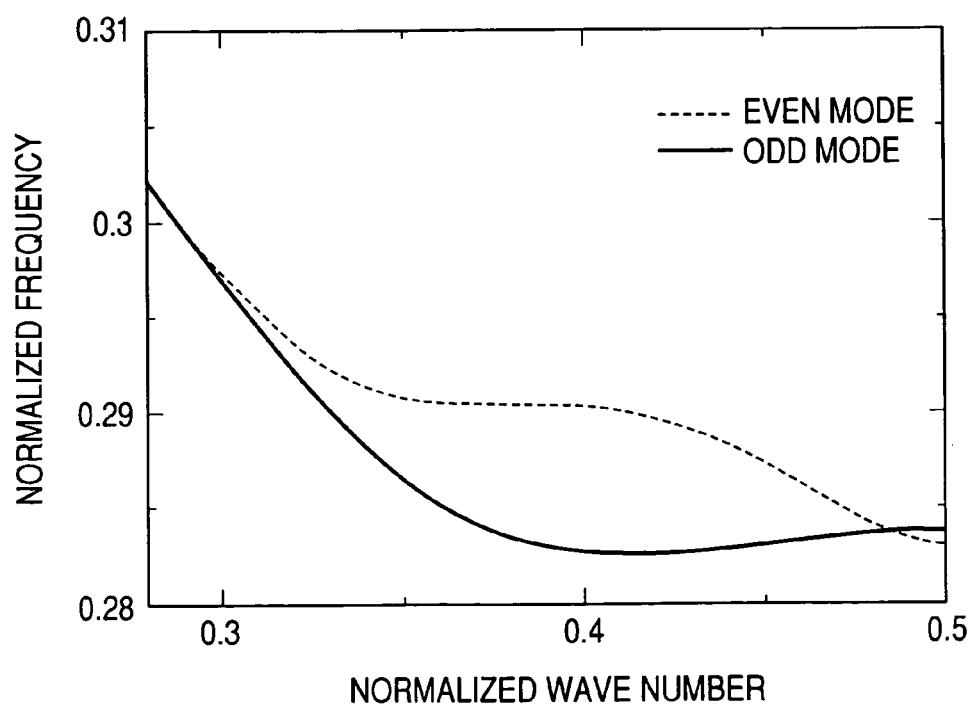
FIG. 11 is a diagram showing a dispersion relationship of a structure shown as the novel structure (FIG. 10).

Therefore, the radii r1 of cylindrical holes in the middle between the waveguides, the radii r2 of cylindrical holes outside the waveguides, and the arrangement $\Delta x$ of cylindrical holes outside the waveguides are changed as shown in FIG. 10. FIG. 10 shows a directional coupler which is designed so as to have the dispersion relationship shown in FIG. 6. The directional coupler switch is configured by the region 1 which is subjected to the nonlinear action, and the region 2 which is not subjected to the nonlinear action, as described with reference to FIG. 4. The region 1 is constituted by the waveguides A and B each having the length $L_{sw}$. The dispersion relationship in the conditions of r1=0.445a, r2=0.33a, and $\Delta x$=0.22a is shown in FIG. 11. FIG. 11 shows the dispersion relationship of the structure shown as the novel structure (FIG. 10). A frequency constant region arises in the even mode, and hence the shortening of the switching length can be expected.

Alternatively, as described with reference to FIG. 5, the directional coupler switch can be configured by a region which is subjected to the nonlinear action, over the whole length thereof. This case also can be configured in the same manner as FIG. 10. In this case, a portion designated by $L_{swt}$ in FIG. 10 is configured as a common multiple of the switching length $L_{sw}$ and the coupling length.

Figure 12:
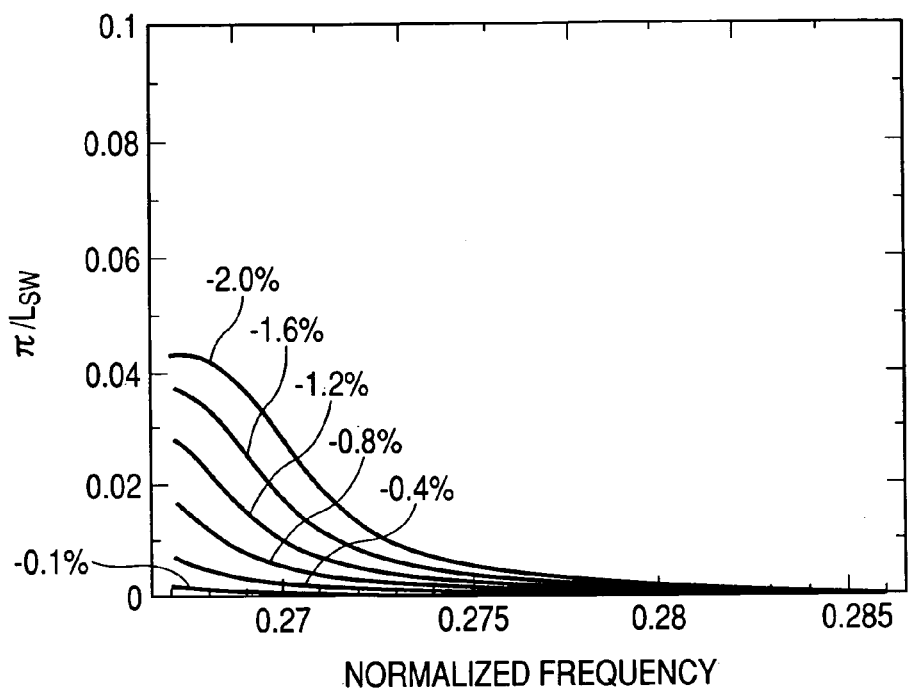
FIG. 12 is a diagram showing a relationship of an inverse number of the switching length with respect to a normalized frequency in the conventional structure.
Figure 13:
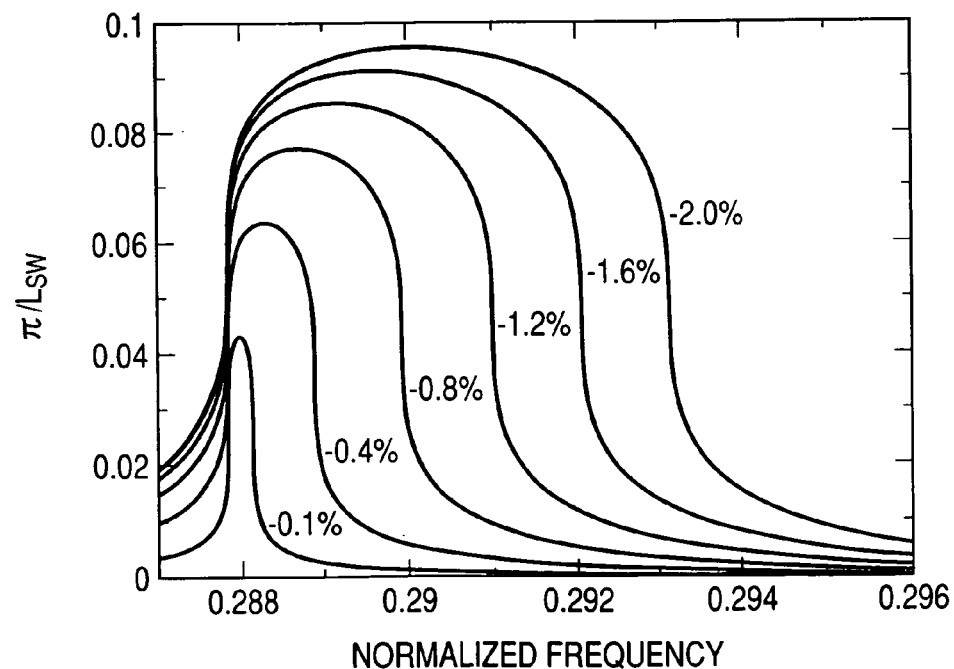
FIG. 13 is a diagram showing a relationship of an inverse number of the switching length with respect to a normalized frequency in the novel structure.

Graphs of $\pi/L_{sw}$ in the case where the refractive index of the background medium is changed from 0.1% to 2.0% for the conventional structure (FIG. 8) and the modified structure (FIG. 10) are shown in FIGS. 12 and 13. The ordinates indicate an inverse of the switching length, and hence a higher value means a shorter switching length.

In the conventional structure, the value of $\pi/L_{sw}$ finally exceeds 0.04 when the refractive index variation becomes 2.0%. In the case where the dispersion curve according to the invention is obtained with using the modified structure, a value of an approximately same degree is obtained at the refractive index variation of only 0.1%. As compared with the case where the refractive index variation is 0.1% in the conventional structure, the switching length is 1/25, so that the effectivity of the invention is exhibited. A bandwidth the degree of which is similar to that of the conventional structure can be obtained.

What is claimed is:

1. A directional coupler switch, comprising:

an input side;

an output side; and a switching portion having a dispersion relationship varied due to a nonlinear action to switch over an exit of the output side of light entering from the input side to provide optical switching, wherein a dispersion curve includes a region of a constant frequency in one of an even mode and an odd mode which are two kinds of eigen modes of a parallel waveguide; and a region in which gradients of the two kinds of eigen modes at a frequency belonging to a region other than the region of a constant frequency are substantially equal to each other.

2. The directional coupler switch according to claim 1, wherein the gradients of the two kinds of eigen modes indicate monotone decreasing or monotone increasing.

3. The directional coupler switch according to claim 1, wherein the dispersion curve of the first region is realized by utilizing a photonic crystal.

4. A directional coupler switch comprising:

a parallel waveguide including a first region which is subjected to a nonlinear action and a second region which is not subjected to a nonlinear action, a dispersion relationship of the first region being varied due to the nonlinear action to switch over an exit of light entering from an input side to cause the switch to function as an optical switch, wherein a dispersion curve of the first region includes:

a region of a constant frequency in one of an even mode and an odd mode which are two kinds of eigen modes of the parallel waveguide; and a region in which gradients of the two eigen modes at frequencies belonging to a region other than the region of a constant frequency are substantially equal to each other.

5. The directional coupler switch according to claim 4, wherein
the gradients of the two kinds of eigen modes indicate monotone decreasing or monotone increasing.

6. The directional coupler switch according to claim 4, wherein
the dispersion curve of the first region is realized by utilizing a photonic crystal.

* * * * *